3,485,835
Patented Dec. 23, 1969

1

3,485,835
2-BENZOYL-3-TERTIARYAMINO ALKOXY BENZOFURAN DERIVATIVES
Arne Elof Brandstrom, Goteborg, and Stig Ake Ingemar Carlsson, Molnlycke, Sweden, assignors to Aktiebolaget Hassle, Goteborg, Sweden, a company of Sweden
No Drawing. Continuation-in-part of application Ser. No. 414,894, Nov. 30, 1964. This application Apr. 10, 1968, Ser. No. 720,399
Int. Cl. C07d 87/28
U.S. Cl. 260—247.7          9 Claims

ABSTRACT OF THE DISCLOSURE

The specification discloses benzofuran derivatives characterized by the formula:

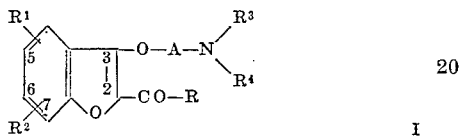

where R represents a lower alkyl group, a phenyl group or a lower alkyl, lower alkoxy, dioxy-lower-alkylene, fluorine, chlorine, bromine or trifluoromethyl substituted phenyl group or a lower alkoxy substituted styryl group, $R^1$ represents a hydrogen, fluorine, chlorine or bromine atom or a lower alkyl or lower alkoxy group, or together with $R^2$ represents a benzo group, $R^2$ represents a hydrogen, fluorine, chlorine or bromine atom or a lower alkyl or lower alkoxy group or provided $R^1$ is a hydrogen atom, a nitro, amino, hydroxy, lower acyloxy, lower alkoxybenzoyloxy, lower dialkylamino or lower acylamino group, A represents an alkylene group containing not more than four carbon atoms, $R^3$ represents a hydrogen atom or a lower alkyl group, $R^4$ represents a lower alkyl, β-phenylethyl or benzyl group or —$NR^3R^4$ represents a pyrrolidino, piperidino, hexamethyleneimino, morpholino, lower dialkylmorpholino, piperazino, lower alkyl piperazino, benzylpiperazino or tetrahydropyridino group, in the form of the free base or of a pharmaceutically acceptable salt thereof.

---

The present invention relates to benzofuran derivatives having valuable pharmacological properties, their production and pharmaceutical preparations containing them. This is a continuation-in-part of application Ser. No. 414,894 filed Nov. 30, 1964, now abandoned.

In one aspect the invention comprises new benzofuran derivatives represented by the general formula:

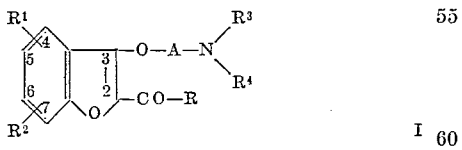

wherein R represents a lower alkyl group, a phenyl group or a lower alkyl, lower alkoxy, dioxy-lower-alkylene, fluorine, chlorine, bromine or trifluoromethyl substituted phenyl group or a lower alkoxy substituted styryl group, $R^1$ represents a hydrogen, fluorine, chlorine or bromine atom or a lower alkyl or lower alkoxy group, or together with $R^2$ represents a benzo group, $R^2$ represents a hydrogen, fluorine, chlorine or bromine atom or a lower alkyl or lower alkoxy group or provided $R^1$ is a hydrogen atom, $R^2$ can be a nitro, amino, hydroxy, lower acyloxy, lower alkoxybenzoyloxy, lower dialkylamino or lower acylamino

2 group, A represents an alkylene group containing not more than four carbon atoms, $R^3$ represents a hydrogen atom or a lower alkyl group, $R^4$ represents a lower alkyl, β-phenylethyl or benzyl group or —$NR^3R^4$ represents a pyrrolidino, piperidino, hexamethyleneimino, morpholino, lower dialkylmorpholino, piperazino, lower alkylpiperazino, benzylpiperazino or tetrahydropyridino group, in the form of the free base or of a pharmaceutically acceptable salt thereof.

Illustrative meanings for the various groups shown in the aforesaid formula are as follows:

A: —$CH_2$—$CH_2$—, —$CH_2$—$CH_2$—$CH_2$—,
—$CH(CH_3)$—$CH_2$—
or —$CH(CH_3)$—$CH(CH_3)$—;
R: methyl, ethyl, n-propyl, iso-propyl, n-butyl, iso-butyl, n-amyl, phenyl, o-tolyl, m-tolyl, p-tolyl, 2,4-dimethylphenyl, 2-chloro-4-methylphenyl, o-methoxyphenyl, m-methoxyphenyl, p-methoxyphenyl, o-ethoxyphenyl, m-ethoxyphenyl, p-ethoxyphenyl, 3,4-methylenedioxyphenyl, p-n-propoxyphenyl, p-isopropoxyphenyl, p-n-butoxyphenyl, o-chlorophenyl, m-chlorophenyl, p-chlorophenyl, o-bromophenyl, m-bromophenyl, p-bromophenyl, o-fluorophenyl, m-fluorophenyl, p-fluorophenyl, o-trifluoromethylphenyl, m-trifluoromethylphenyl or p-trifluoromethylphenyl;
$R^1$ and $R^2$: hydrogen, methyl, ethyl, n-propyl, isopropyl, n-butyl, iso-butyl, n-amyl, methoxy, ethoxy, n-propoxy, iso-propoxy, n-butoxy, fluorine, chlorine, bromine, and, when $R^1$ is hydrogen, $R^2$ may additionally represent nitro, amino, hydroxy, acetoxy, propionoxy, dimethylamino, diethylamino, di-n-propylamino, formylamino, acetylamino, propionylamino, butyrylamino or iso-butyrylamino;
$R^3$: hydrogen, methyl, ethyl, n-propyl, iso-propyl, n-butyl, iso-butyl or n-amyl;
$R^4$: methyl, ethyl, n-propyl, iso-propyl, n-butyl, iso-butyl, n-amyl or benzyl;
—$NR^3R^4$: pyrrolidino, piperidino, hexamethyleneimino, morpholino, 2,6-dimethylmorpholino, piperazino, N-methylpiperazino, N-ethylpiperazino, N-benzylpiperazino or tetrahydropyridino;

The preferred compounds of the invention are those in which R is a phenyl or p-lower alkoxy phenyl group, $R^1$ is a hydrogen atom, $R^2$ is in the 5-position and is a nitro, lower alkyl or lower alkoxy group or a hydrogen, fluorine, chlorine or bromine atom, A is a

—$CH_2$—$CH_2$— group and —$NR^3R^4$ is a di-lower-alkylamino, pyrrolidino, piperidino, morpholino, 2,6-dimethylmorpholino or tetrahydropyridino group.

The benzofuran derivatives of this invention have been shown to possess one or more of the following valuable pharmacological properties: analgesic, antipyretic, anti-inflammatory, antitussive, local anesthetic, antispasmodic and antihistaminic activity, combined with relatively low toxicity. Accordingly they may be used for the relief of pain, inflammation, or pyresis of various origins or tussive irritation.

In clinical practice the benzofuran derivatives of the invention will normally be administered orally, rectally or by injection in the form of pharmaceutical preparations comprising the active ingredient in the form of the free base or a common pharmaceutically acceptable salt, e.g. the hydrochloride, in association with a pharmaceutically acceptable carrier which may be a solid, semi-solid or liquid diluent or an ingestible capsule and such preparations comprise a further aspect of the invention. Usually the active substance will comprise between 0.1 and 95% by weight of the preparation, for example, between 0.5 and 20% for preparations intended for injection and between 2 and 50% for preparations intended for oral administration.

To produce pharmaceutical preparations in the form of dosage units for oral application containing a compound of the invention in the form of the free base, a pharmaceutically acceptable acid addition salt may be mixed with a solid, pulverulent carrier, for example lactose, saccharose, sorbitol, mannite, starches such as potato starch, corn starch, amylopectin, laminaria powder or citrus pulp powder, cellulose derivatives, or gelatine, and also may include lubricants such as magnesium or calcium stearate or a Carbowax or other polyethylene glycol wax and compressed to form tablets or centres for dragees. If dragees are required, the centres may be coated with a concentrated sugar solution which may contain gum arabic, talcum and/or titanium dioxide, or alternatively with a lacquer dissolved in a readily volatile organic solvent or mixture of organic solvents. Dyestuffs may be added to these coatings, for example to distinguish between different contents of active substance. For the preparation of soft gelatin capsules (pearl-shaped closed capsules) consisting of gelatin and for example glycerin, or similar closed capsules the substance may be admixed with Carbowax. Hard gelatin capsules may contain granulates of the active substance with solid, pulverulent carriers such as lactose, saccharose, sorbitol, mannite, starches (e.g. potato starch, corn starch or amylopectin) cellulose derivatives or gelatin and may also include magnesium stearate or stearic acid. Dosage units for rectal application may be suppositories comprising the active substance in admixture with a neutral fatty base, or gelatin rectal capsules comprising the active substance in admixture with a Carbowax or other polyethylene glycol wax.

Liquid preparations for oral application may be in the form of syrups or suspensions, for example solutions containing from about 2% and to about 20% by weight of active substance, sugar and a mixture of ethanol, water and glycerin, propyleneglycol and, optionally, aroma, saccharine and/or carboxymethylcellulose as a dispersing agent.

For parenteral application by injection the preparations of the invention advantageously comprise an aqueous solution of a water soluble pharmaceutically acceptable salt of the active substance desirably in a concentration of 0.5–10%, and optionally also a stabilising agent and/or buffer substance. Dosage units of the solution may with advantage be enclosed in ampoules.

Benzofuran derivatives of Formula I above, may be prepared according to a further aspect of the invention by a process which comprises condensing a compound of the formula:

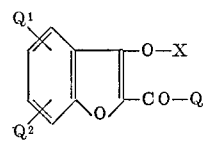

II with a compound of the formula:

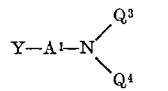

III wherein $A^1$, Q and $Q^1$ have the same meaning as A, R and $R^1$ respectively, $Q^2$ represents a hydrogen, fluorine, chlorine or bromine atom or a lower alkyl or lower alkoxy group or provided $Q^1$ represents a hydrogen atom a nitro, lower acyloxy, lower alkoxy substituted benzoyloxy, lower dialkylamino or lower acylamino group or a hydroxy or amino group substituted by a protecting group replaceable by hydrogen by hydrolysis or hydrogenation, or together with $Q^1$ represents a benzo group, $Q^3$ represents a lower alkyl group or a protecting group replaceable by hydrogen by hydrolysis or hydrogenation, $Q^4$ represents a lower alkyl, β-phenylethyl or benzyl group or $NQ^3Q^4$ represents a pyrrolidino, piperidino, hexamethyleneimino, morpholino, tetrahydropyridino or lower dialkylmorpholino group or a piperazino, lower alkyl piperazino or benzyl piperazino group in which the nitrogen atom in the 4-position is substituted by a lower alkyl or benzyl group or by a protecting group replaceable by hydrogen by hydrolysis or hydrogenation, and X and Y represent atoms or groups reactable together to form an ether linkage between the furan moiety and the group $A^1$ and, where a benzofuran derivative which contains a hydroxyl group or a primary or secondary amino group is desired, replacing the protecting group or groups by hydrolysis or hydrogenation. Where the benzofuran derivative is required in the form of a pharmaceutically acceptable salt the process may include the step of converting the product of the condensation step before or after removal of any protecting steps present into the desired salt. Wherein the desired product $R^2$ represents an acyloxy or acylamino group, thereby may first be formed the corresponding hydroxy or amino compound which is then acylated to give the desired product. Where in the desired product $R^2$ represents an amino group, there may first be produced the corresponding nitro compound which is then hydrogenated.

In the compounds of Formulae II and III, X may, for example represent hydrogen, sodium, potassium, rubidium or trialkylammonium, and Y may, for example represent halogen, such as chlorine or bromine or a functionally equivalent group such as benzenesulphonyl or toluylsulphonyl.

Starting materials of the general formula:

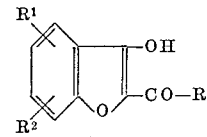

where R, $R^1$ and $R^2$ have the same significance as stated above may be prepared by several different methods, as illustrated by the following reaction schemes:

*Method A*

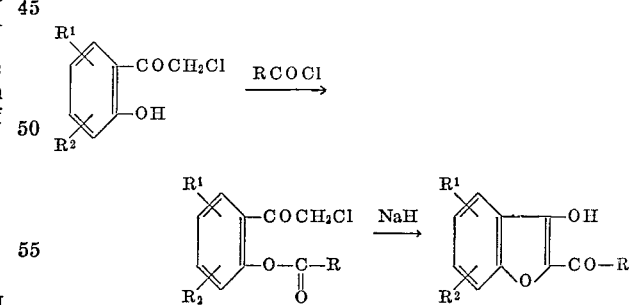

When R represents an aliphatic group, desirably an acid anhydride is used in the first step instead of an acid chloride.

*Method B*

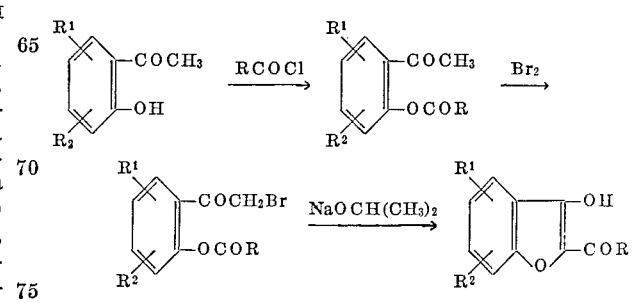

*Method C*

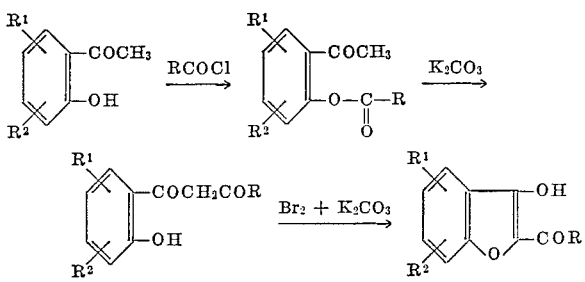

In some special cases, when very sensitive groups are present in the molecule, it may be necessary to use condensing agents different from those specified above, as will be apparent from the following illustrative specific procedures for the preparation of the benzofuran starting materials.

2 - aroyloxy-ω-chloroacetophenones have been synthesised by the following procedure for carrying out the first stage of Method A:

A mixture of 170 g. of 2-hydroxy-5-methyl-ω-chloroacetophenone and 156 g. of p-methoxybenzoyl chloride was heated to 160° C. for 4 hours. After cooling the mixture was triturated with a small amount of ethanol and filtered. After recrystallisation from benzene-ligroin 188 g. of 2-(p-methoxybenzoyloxy)-5-methyl-ω-chloroacetophenone (M.P. 120° C.) were obtained.

The following 2-aroyloxy-ω-chloroacetophenones have been prepared in an analogous way:

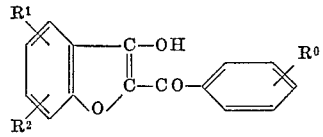

| R⁰ | R¹ | R² | M.P., ° C. |
|---|---|---|---|
| H | 5-CH₃ | H | 92 |
| H | 5-OCH₃ | H | 97 |
| H | 4-OCH₃ | H | 105 |
| 3'-OCH₃ | 5-CH₃ | H | 104 |
| 4'-OCH₃ | 5-CH₃ | H | 120 |
| 4'-OC₂H₅ | 3-CH₃ | H | 104 |
| 4'-OC₂H₅ | 4-CH₃ | 5-CH₃ | 145 |
| 4'-OC₂H₅ | 5-OCH₃ | H | 125 |
| 4'-OC₂H₅ | 4-OCH₃ | H | --- |
| 4'-OC₃H₇ | 5-CH₃ | H | 103 |
| 4'-OC₄H₉ | 5-CH₃ | H | 143 |
| 3',4'-OCH₂O— | 5-CH₃ | H | 134 |

2-acyloxy-ω-chloroacetophenones have been synthesised by the following procedure for carrying out the first stage of Method A:

5 drops of 70% perchloric acid were added to a mixture of 91 g. of 2-hydroxy-4-methoxy-ω-chloroacetophenone and 135 ml. of isobutyric anhydride. After stirring for 1.5 hours at room temperature water was added. After further 3 hours stirring the resulting crystalline 2-isobutyroxy-4-methoxy-ω-chloroacetophenone was collected and recrystallised from ligroin. 82 g. of pure product (M.P. 64° C.) were obtained. The following 2-acyloxy-ω-chloroacetophenones have been prepared in an analogous way:

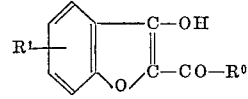

| R⁰ | R¹ | M.P., ° C. |
|---|---|---|
| —CH₃ | 4-OCH₃ | 103 |
| —CH₃ | 5-OCH₃ | --- |
| —C₂H₅ | H | --- |
| —C₂H₅ | 5-CH₃ | 70 |
| —C₂H₅ | 4-OCH₃ | --- |
| —C₂H₅ | 5-OCH₃ | 80 |
| —CH(CH₃)₂ | 4-OCH₃ | 64 |

2-aroyl-3-hydroxy-benzofurans have been synthesised by the following procedure for carrying out the second stage of Method A:

188 g. of 2-(p-methoxybenzoyloxy)-5-methyl-ω-chloroacetophenone were dissolved in 1880 ml. of anhydrous dioxane. To the solution 40 g. of NaH (53.7% in mineral oil) were added in portions. After stirring for 3 hours at room temperature the mixture was poured into 600 ml. of 2 N H₂SO₄. The crystals which separated were collected, washed with water and petroleum ether and recrystallised from acetic acid. 112 g. of 2-(p-methoxybenzoyl)-3-hydroxy-5-methyl-benzofuran (M.P. 145° C.) were obtained.

The following 2-aroyl-3-hydroxy-benzofurans have been prepared in an analogous way:

| R⁰ | R¹ | R² | M.P., ° C. |
|---|---|---|---|
| H | 5-CH₃ | H | 114 |
| H | 5-OCH₃ | H | 128 |
| H | 6-OCH₃ | H | 95 |
| 3'-OCH₃ | 5-CH₃ | H | 103 |
| 4'-OCH₃ | 5-CH₃ | H | 145 |
| 4'-OC₂H₅ | 7-CH₃ | H | 127 |
| 4'-OC₂H₅ | 5-CH₃ | 6-CH₃ | 147 |
| 4'-OC₂H₅ | 5-OCH₃ | H | 96 |
| 4'-OC₂H₅ | 6-OCH₃ | H | --- |
| 4'-OC₃H₇ | 5-CH₃ | H | 123 |
| 4'-OC₄H₉ | 5-CH₃ | H | 133 |
| 3'-4'—O—CH₂—O— | 5-CH₃ | H | 146 |

2-acyl-3-hydroxybenzofurans have been synthesised by the following procedure for carrying out the second step of Method A:

82 g. of 2-isobutyroxy-4-methoxy-ω-chloroacetophenone were dissolved in 1000 ml. of dioxane. 17.2 g. of NaH (53.7% in mineral oil) were added at such a rate that the temperature was kept between 50° and 60° C. After stirring for 3 hours at 50° C. methanol was added to decompose any remaining NaH and the mixture was poured into 2 N HCl. The resulting crystalline product was recrystallised from ethanol. 50 g. of pure 2-isobutyryl-3-hydroxy-6-methoxy-benzofuran (M.P. 63–64° C.) were obtained.

The following 2-acyl-3-hydroxybenzofurans have been prepared in an analogous way:

| R⁰ | R¹ | M.P., ° C. |
|---|---|---|
| —CH₃ | 5-OCH₃ | 106 |
| —CH₃ | 6-OCH₃ | 104 |
| —C₂H₅ | H | --- |
| —C₂H₅ | 5-CH₃ | 98 |
| —C₂H₅ | 5-OCH₃ | --- |
| —C₂H₅ | 6-OCH₃ | 224 |
| —CH(CH₃)₂ | 6-OCH₃ | 64 |

2-aroyloxyacetophenones have been prepared by the following procedure for carrying out the first stage of Method B:

In a 250 ml. flask with reflux cooling, 37.5 g. of 2-hydroxy-5-methylacetophenone were dissolved in 100 ml. of pyridine. 36.6 g. of benzoylchloride were added and the mixture was heated on a water bath for 15 minutes. After being allowed to cool for 30 minutes, it was poured into 750 ml. of 2 N HCl. After several hours refrigeration, the precipitate was collected and washed with water. After recrystallisation from 250 ml. of 99.5% ethanol, 45.5 g. of 2-benzoyloxy-5-methyl-acetophenone (M.P. 64–66° C.) were obtained.

The following 2-aroyloxyacetophenones have been prepared in an analogous way:

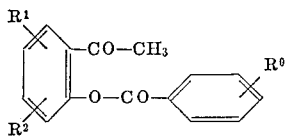

| R⁰ | R² | R¹ | M.P., °C. |
|---|---|---|---|
| H | H | H | 92 |
| H | 4-CH₃ | H | (¹) |
| H | 4-CH₃ | 5-CH₃ | 76 |
| H | 3-CH₃ | 5-CH₃ | 98 |
| H | 5-Cl | H | 71 |
| H | 5-Br | H | 56 |
| H | 5-Cl | 4-CH₃ | 98 |
| 4'-CH₃ | H | H | 100 |
| 4'-CH₃ | 5-CH₃ | H | 90 |
| 4'-F | 5-CH₃ | H | 105 |
| 3'-Cl | H | H | 80 |
| 4'-Cl | 5-CH₃ | H | 95 |
| 4'-CC₂H₅ | H | H | 90 |
| 4'-OC₂H₅ | 6-CH₃ | H | 125 |
| 4'-OC₂H₅ | 5-CH₃ | H | 115 |
| 4'-OC₂H₅ | 4-CH₃ | H | 112 |
| 4'-OC₂H₅ | 3-CH₃ | 5-CH₃ | 103 |
| 4'-OC₂H₅ | 3-CH₃ | 4.5-di-CH₃ | 104 |
| 4'-OC₂H₅ | 5-C₂H₅ | H | 75 |
| 4'-OC₂H₅ | 5-n-C₃H₇ | H | 76 |
| 4'-OC₂H₅ | 5-F | H | 92 |
| 4'-OC₂H₅ | 5-Cl | H | 89 |
| 4'-OC₂H₅ | 4-Cl | H | 95 |
| 4'-OC₂H₅ | 5-Br | H | 105 |
| 4'-OC₂H₅ | 5-Cl | 4.6-di-CH₃ | 88 |
| 4'-OC₂H₅ | 5.6-benzo | | 133 |
| 4'-OC₂H₅ | 4.5-benzo | | 119 |
| 4'-OC₂H₅ | 3.4-benzo | | 196 |
| 4'-OC₂H₅ | 6-OCH₃ | H | 90 |
| 4'-OC₂H₅ | 5-OC₂H₅ | H | 109 |
| 4'-OC₂H₅ | 5-NO₂ | H | 109 |
| 4'-OC₂H₅ | 5-CO-C₆H₅ | H | 113 |
| 3'-CF₃ | 5-CH₃ | H | 72 |

¹ B.P.₀.₀₂₅ = 150–165° C.

2-aroyloxy-ω-bromoacetophenones have been prepared by the following specific procedure for carrying out the second stage of Method B.

43.3 g. of 2-benzoyloxy-5-methylacetophenone were dissolved in 600 ml. of ether in a 1000 ml. flask fitted with a stirrer and reflux condenser. A small quantity of benzoylperoxide followed by 28.5 g. of bromine were added to the solution. The mixture was stirred for 30 minutes and illuminated with a 250W electric lamp. The bromine color disappeared very rapidly. The ether solution was washed twice with 150 ml. of water, cooled and filtered to yield 40.5 g. of crude product. By evaporation of the mother liquor and trituration with water a further 19.1 g. were obtained. After recrystallisation from about 1500 ml. of petrol ether 49.6 g. of 2-benzoyloxy-5-methyl-ω-bromoacetophenone (M.P. 88–90° C.) were obtained.

The following 2-aroyloxy-ω-bromoacetophenones have been prepared in an analogous way:

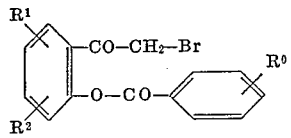

| R⁰ | R² | R¹ | M.P., °C. |
|---|---|---|---|
| 4'-CH₃ | 5-CH₃ | H | 91 |
| 4'-F | 5-CH₃ | H | 92 |
| 4'-Cl | 5-CH₃ | H | 110 |
| 4'-OC₂H₅ | 6-CH₃ | H | 102 |
| 4'-OC₂H₅ | 5-CH₃ | H | 130 |
| 4'-OC₂H₅ | 3-CH₃ | 5-CH₃ | 103 |
| 4'-OC₂H₅ | 3-CH₃ | 4.5-di-CH₃ | 126 |
| 4'-OC₂H₅ | 5-C₂H₅ | H | 90 |
| 4'-OC₂H₅ | 5-n-C₃H₇ | H | 82 |
| 4'-OC₂H₅ | 5-F | H | 110 |
| 4'-OC₂H₅ | 5-Cl | H | 99 |
| 4'-OC₂H₅ | 4-Cl | H | 124 |
| 4'-OC₂H₅ | 5-Br | H | 100 |
| 4'-OC₂H₅ | 5-Cl | 4.6-di-CH₃ | 110 |
| 4'-OC₂H₅ | 5.6-benzo | | 140 |
| 4'-OC₂H₅ | 4.5-benzo | | 155 |
| 4'-OC₂H₅ | 3.4-benzo | | 131 |
| 4'-OC₂H₅ | 6-OCH₃ | H | 109 |
| 4'-OC₂H₅ | 5-OC₂H₅ | H | ---------- |
| 4'-OC₂H₅ | 5-NO₂ | H | 140 |
| 4'-OC₂H₅ | 5-CO—C₆H₅ | H | 103 |
| 3'-CF₃ | 5-CH₃ | H | 109 |

2-aroyl-3-hydroxybenzofurans have been synthesised by the following specific procedure for carrying out the third stage of Method B:

In a 2 litre three necked flask 6.8 g. of sodium were dissolved in 500 ml. of isopropanol. 49 g. of 2-benzoyloxy-5-methyl-ω-bromoacetophenone were added to the solution while still hot. Portions of about 5 g. were added during a period of 5–10 minutes while the reaction mixture was vigorously stirred. 5 minutes later 150 ml. of 2.5 N HCl were added and the mixture was cooled. The product was collected, washed with water and recrystallised from about 450 ml. of absolute ethanol. 24.8 g. of the product (M.P. 111–113° C.) were obtained.

The following 2-aroyl-3-hydroxyacetophenones have been prepared in an analogous way:

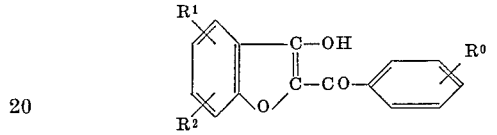

| R⁰ | R² | R¹ | M.P., °C. |
|---|---|---|---|
| 4'-CH₃ | 5-CH₃ | H | 118 |
| 4'-F | 5-CH₃ | H | 140 |
| 4'-Cl | 5-CH₃ | H | 144 |
| 4'-OC₂H₅ | 4-CH₃ | H | 135 |
| 4'-OC₂H₅ | 5-CH₃ | H | 140 |
| 4'-OC₂H₅ | 5-CH₃ | 7-CH₃ | 172 |
| 4'-OC₂H₅ | 5-CH₃ | 6.7-di-CH₃ | 164 |
| 4'-OC₂H₅ | 5-C₂H₅ | H | 132 |
| 4'-OC₂H₅ | 5-n-C₃H₇ | H | 124 |
| 4'-OC₂H₅ | 5-F | H | 146 |
| 4'-OC₂H₅ | 5-Cl | H | 144 |
| 4'-OC₂H₅ | 6-Cl | H | 149 |
| 4'-OC₂H₅ | 5-Br | H | 150 |
| 4'-OC₂H₅ | 5-Cl | 4.6-di-CH₃ | 164 |
| 4'-OC₂H₅ | 4.5-benzo | | 170 |
| 4'-OC₂H₅ | 5.6-benzo | | 164 |
| 4'-OC₂H₅ | 6.7 benzo | | 176 |
| 4'-OC₂H₅ | 4-OCH₃ | H | 150 |
| 4'-OC₂H₅ | 5-OC₂H₅ | H | 147 |
| 4'-OC₂H₅ | 5-NO₂ | H | 164 |
| 4'-OC₂H₅ | 5-CO-C₆H₅ | H | 159 |
| 3'-CF₃ | 5-CH₃ | H | 114 |

2-hydroxydibenzoylmethanes have been produced by the following specific procedure for carrying out the first stage of Method C:

163 g. of o-benzoyloxyacetophenone were dissolved in 2000 ml. of pyridine. After the addition of 113 g. of potassium carbonate the mixture was refluxed for 1 hour, cooled to room temperature and acidified with dilute acetic acid. The resulting crystalline product was collected, washed, and recrystallised from ethanol. 102 g. of pure 1 - (o-hydroxyphenyl)-3-phenylpropandione-1,3 (M.P. 118° C.) were obtained.

The following 2-hydroxydibenzoylmethanes have been prepared in an analogous way:

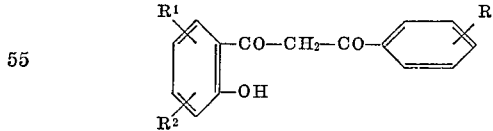

| R⁰ | R¹ | R² | M.P., °C. |
|---|---|---|---|
| H | H | H | 118 |
| H | 4-CH₃ | H | 87 |
| H | 4-CH₃ | 5-CH₃ | 116 |
| H | 3-CH₃ | 5-CH₃ | 85 |
| H | 5-Cl | H | 110 |
| H | 5-Br | H | 120 |
| H | 4-CH₃ | 5-Cl | 127 |
| 4'-CH₃ | H | H | 110 |
| 3'-Cl | H | H | 115 |
| 4'-OC₂H₅ | H | H | 109 |
| 4'-OC₂H₅ | 4-CH₃ | H | ---------- |

2-aroyloxy-3-hydroxybenzofurans have been prepared by the following specific procedure for carrying out the second stage of Method C:

102 g. of pure 1-(o-hydroxyphenyl)-3-phenylpropandione-1,3 were dissolved in 1000 ml. of carbon tetrachloride. 128 g. of potassium carbonate were added to the solution, which was cooled to 0° C. A solution of 69 g. of bromine in 100 ml. of carbon tetrachloride was then added drop by drop with stirring, after which the reaction mixture was refluxed during 1 hour, cooled to room temperature and filtered. The solid material filtered off was suspended in water and the suspension acidified with 2 N HCl. After filtration and recrystallisation from ethanol 60 g. of 2-benzoyl-3-hydroxybenzofuran (M.P. 81° C.) were obtained.

The following 2-aroyloxy-3-hydroxybenzofurans have been prepared in an analogous way:

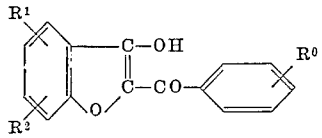

| $R^0$ | $R^1$ | $R^2$ | M.P., ° C. |
|---|---|---|---|
| H | H | H | 81 |
| H | 6-CH$_3$ | H | 83 |
| H | 5-CH$_3$ | 6-CH$_3$ | 99 |
| H | 5-CH$_3$ | 7-CH$_3$ | 100 |
| H | 5-Cl | H | 130 |
| H | 5-Br | H | 142 |
| H | 5-Cl | 6-CH$_3$ | 108 |
| 4'-CH$_3$ | H | H | 108 |
| 3'-Cl | H | H | 102 |
| 4'-OC$_2$H$_5$ | H | H | 121 |
| 4'OC$_2$H$_5$ | 6-CH$_3$ | H | 148 |

The present invention is illustrated by the following examples.

EXAMPLE I 20 g. of 2-(p-methoxybenzoyl)-3-hydroxy-5-methylbenzofuran were dissolved in 200 ml. of acetone. 29 g. of anhydrous potassium carbonate were first added to the solution, and then 15 g. of N-2-chloroethylpyrrolidine hydrochloride. The mixture was refluxed with stirring for 24 hours. After filtration and washing with acetone the combined filtrates from the initial filtration and the washing operations were evaporated on a water-bath at reduced pressure giving an oily residue. The residue was dissolved in ether and after removal of solids by filtration an etherial solution of hydrogen chloride was added. Crystals of the hydrochloride of 2-(p-methoxybenzoyl)-3-(β-pyrrolidinoethoxy) - 5 - methylbenzofuran were obtained. Recrystallisation from ethanol gave 21 g. of pure hydrochloride (M.P. 184–187° C., equivalent weight: found 419, calculated 416).

EXAMPLE II 11.9 g. of 2-benzoyl-3-hydroxybenzofuran were dissolved in 100 ml. of acetone and 20.7 g. of anhydrous potassium carbonate were added. When the potassium salt had been formed 9.2 g. of the hydrochloride of N-(β-chloroethyl)-1,2,5,6-tetrahydropyridine were added and the mixture was refluxed for 24 hours. The mixture was filtered and evaporated to dryness. The residue was dissolved in ether, the resulting solution was filtered and to it was added an etherial solution of hydrogen chloride. The hydrochloride of 2-benzoyl-3-(β-1,2,5,6-tetrahydropyridinoethoxy)-benzofuran separated in crystalline form. Recrystallisation from ethanol gave 8 g. pure hydrochloride (M.P. 163–166° C., equivalent weight: found 381, calculated 384).

EXAMPLE III 25 g. of 2-isobutyryl-3-hydroxy-6-methoxybenzofuran were dissolved in 300 ml. of dioxane. 46 g. of anhydrous potassium carbonate were added and then 26 g. of N-2-chloroethylmorpholine hydrochloride. The resulting mixture was refluxed for 15 hours, filtered and evaporated. The residue was dissolved in ether and the etherial solution was extracted with 2 N hydrochloric acid. The aqueous phase was then made alkaline with sodium hydroxide and extracted with ether. The etherial extract was dried, evaporated and the resulting oily residue was dissolved in acetone. By addition of an etherial solution of hydrogen chloride the hydrochloride of 2-isobutyryl-3-(2-morpholinoethoxy)-6-methoxybenzofuran was obtained. Recrystallisation from ethanol gave 20 g. of pure hydrochloride (M.P. 176–178° C., equivalent weight: found 386, calculated 384).

EXAMPLE IV

In a 500 ml. flask fitted with a stirrer and reflux condenser 8.4 g. of p-toluenesulphonylchloride, 200 ml. of acetone and 5.1 g. of β-pyrrolidinoethanol were mixed together. The mixture was boiled for 10 minutes and cooled. Then 11.9 g. of 2-(p-ethoxybenzoyl)-3-hydroxy-5-methylbenzofuran and 16.6 g. of anhydrous potassium carbonate were added. After boiling overnight the mixture was cooled and filtered. The acetone solution was evaporated and the residue boiled with ether and filtered. The precipitate was washed with dry ether. The etherial solutions thus obtained were combined and evaporated. The resulting residue was dissolved in 200 ml. of acetone and acidified with hydrogen chloride in acetone of pH 3–4. After filtration the mother liquor was evaporated and the residue dissolved in 10 ml. of absolute ethanol and precipitated with 50 ml. of acetone. After cooling 0.6 g. of 2-(p-ethoxybenzoyl)-3-(β-pyrrolidinoethoxy)-5-methylbenzofuran was obtained. M.P. 190° C.

EXAMPLE V

In a 500 ml. flask fitted with a reflux condenser 8.5 g. 200 ml. of acetone and 10.8 of 2-pyrrolidinoethylchloride were mixed. After boiling for 17 hours the reaction mixture was evaporated and the residue made alkaline with 10 ml. of 2 N sodium hydroxide. After the addition of 200 ml. of ether the mixture was filtered and the ether layer separated, washed with water and the water layer was separated and itself extracted with ether. The combined ether extracts were dried with sodium sulphate and the ether was evaporated, the last traces being removed on a boiling water-bath under a slight vacuum. The residue (2.6 g.) was dissolved in 30 ml. of acetone and acidified to pH about 4 with hydrogen chloride dissolved in acetone. After cooling the precipitate was collected and washed with ice-cold acetone. The crude product (1.2 g.) was dissolved in 6 ml. of hot absolute ethanol after which 30 ml. of hot acetone was added.

After cooling 0.2 g. of 2-(p-ethoxybenzoyl)-3-(β-pyrrolidinoethoxy)-5-methylbenzofuran (M.P. 193–196° C.) was obtained.

EXAMPLE VI

In a 500 ml. flask fitted with a stirrer and a reflux condenser 11.9 g. of 2-(p-ethoxybenzoyl)-3-hydroxy-5-methylbenzofuran, 150 ml. of tri-ethylamine and 7.5 g. of 2-pyrrolidinoethylchloride-hydrochloride were mixed. The mixture was boiled overnight and cooled. 100 ml. of 2 N sodium hydroxide and 200 ml. of ether were added, the mixture was filtered and allowed to separate into layers. The aqueous layer was washed with ether and the combined ether layers were washed with water, dried with sodium sulphate and evaporated. The residue (6.5 g.) was dissolved in dry ether, and the solution was filtered and the filtrate evaporated. The residue (3.1 g.) was dissolved in 150 ml. of acetone and acidified to pH 3–4 with hydrogen chloride dissolved in acetone. After cooling 0.6 g. of crude product was obtained. After reprecipitation from 3 ml. of hot absolute ethanol by the addition of 15 ml. of acetone 0.5 g. of 2-(p-ethoxybenzoyl)-3-(β-pyrrolidinoethoxy)-5-methylbenzofuran (M.P. 190–192° C.) was obtained after cooling.

EXAMPLE VII

In a 500 ml. flask with stirrer and reflux condenser 1.0 g. of 50% sodium hydride was dissolved in 150 ml. of dimethylsulphoxide. 11.9 g. of 2-(p-ethoxybenzoyl)-3-hydroxy-5-methylbenzofuran were added and the mixture was stirred during about 15 minutes after which 6.7 g. of 2-pyrrolidinoethylchloride were added. After heating during 3 hours on a water-bath the reaction mixture was filtered and evaporated. The residue was dissolved in acetone and filtered and the filtrate acidified to pH 3–4 with hydrogen chloride dissolved in acetone. After cooling the precipitate was collected and washed with ice-cold acetone. The crude produce (9.5 g.) was dissolved in 5.0 ml. hot absolute ethanol and 250 ml. of acetone were added. After cooling 5.1 g. of 2-(p-ethoxybenzoyl)-3-($\beta$-pyrrolidinoethoxy)-5-methylbenzofuran (M.P. 168–188° C.) were obtained.

EXAMPLE VIII

In a 250 ml. flask with stirrer and a reflux condenser 5.9 g. of 2-(p-ethoxybenzoyl)-3-hydroxy-5-methylbenzofuran, 100 ml. of acetone and 13.9 g. of rubidium carbonate were mixed. The mixture was stirred and boiled for 1 hour after which 3.8 g. of 2-pyrrolidinoethylchloride-hydrochloride were added. The mixture was boiled overnight, filtered and washed with acetone. The acetone was evaporated and the residue dissolved in dry ether, filtered and evaporated. The residue (8.3 g.) was dissolved in 100 ml. acetone and acidified to pH 3–4 with hydrogen chloride dissolved in acetone. The precipitate was collected after cooling and washed with ice-cold acetone. The crude product (7.4 g.) was reprecipitated from 35 ml. of hot absolute ethanol by the addition of 180 ml. of hot acetone. After cooling and filtering 6.6 g. of 2-(p-ethoxybenzoyl)-3-($\beta$-pyrrolidinoethoxy) - 5 - methylbenzofuran (M.P. 188–190° C.) were obtained.

EXAMPLE IX

In a 500 ml. flask fitted with a stirrer and a reflux condenser 11.9 g. of 2-(p-ethoxybenzoyl)-3-hydroxy-5-methylbenzoylfuran, 200 ml. of acetone and 16.6 g. of anhydrous potassium carbonate were boiled for 1 hour. 11.5 g. of $\beta$-diethylamino-ethylbromide-hydrobromide were added and after boiling overnight the mixture was filtered, washed with acetone and evaporated. The residue (16.4 g.) was dissolved in dry ether, filtered and evaporated. The residue (16.0 g.) was dissolved in 300 ml. of acetone and acidified to pH 3–4 with hydrogen chloride dissolved in acetone. After recrystallisation from 200 ml. acetone 13.1 g. of 2-(p-ethoxybenzoyl)-3-($\beta$-diethylaminoethoxy)-5-methylbenzofuran (M.P. 164° C.) were obtained.

EXAMPLE X

In the same way as described in Example VIII but using 200 ml. of dimethylformamide as solvent and 16.6 g. of anhydrous potassium carbonate, 7.8 g. of 2-(p-ethoxybenzoyl)-3-($\beta$-pyrrolidinoethoxy) - 5 - methylbenzofuran (M.P. 190° C.) were obtained.

EXAMPLE XI 29.6 g. of 2-(p-ethoxybenzoyl)-3-hydroxy-5-methylbenzofuran, 500 ml. of acetone, 41.4 g. of anhydrous potassium carbonate and 24.2 g. of N-methyl-$\beta$-benzylaminoethylchloride-hydrochloride were mixed together and the mixture was boiled with stirring under reflux for 24 hours. After cooling potassium chloride was filtered off and washed with acetone. The acetone was evaporated in vacuo and the residue dissolved in ether and the solution acidified to pH 5 with hydrogen chloride dissolved in ether. Recrystallisation from ethyl acetate gave 25.3 g. of the hydrochloride of 2-(p-ethoxybenzoyl)-3-($\beta$-N-methylbenzylaminoethoxy) - 5 - methylbenzofuran (M.P. 140–150° C., equivalent weight: calculated 480, found 486).

EXAMPLE XII 4.0 g. of 2-(p-ethoxybenzoyl)-3-($\beta$-N-methylbenzylaminoethoxy) - 5 - methylbenzofuran-hydrochloride were dissolved in 70 ml. of 95% ethanol. A suspension of 0.5 g. of palladised charcoal in 10 ml. of 95% alcohol was added and the mixture was hydrogenated until 220 ml. of hydrogen had been absorbed. The reaction mixture was filtered, the filtrate was evaporated and the residue recrystallised from ethanol, giving 1.8 g. of the hydrochloride of 2-(p-ethoxybenzoyl) - 3-($\beta$ - methylaminoethoxy)-5-methylbenzofuran (M.P. 183–190° C., equivalent weight: calculated 390, found 388).

EXAMPLE XIII 5.0 of 2-(p-ethoxybenzoyl)-3-($\beta$-pyrrolidinoethoxy)-5-nitro-benzofuran-hydrochloride were dissolved in 100 ml. of 80% ethanol and hydrogenated using palladised charcoal as catalyst. The reaction mixture was filtered, the filtrate evaporated and the residue recrystallised from acetone, giving 3.2 g. of the hydrochloride of 2-(p-ethoxybenzoyl)-3-($\beta$-pyrrolidinoethoxy) - 5 - aminobenzofuran (M.P. 165–185° C., equivalent weight: calculated 431, found 435).

EXAMPLE XIV 1.8 g. of 2-(p-ethoxybenzoyl)-3-($\beta$-pyrrolidinoethoxy)-5-amino-benzofuran-hydrochloride were dissolved in 50 ml. of water and the solution was made alkaline with sodium hydroxide and extracted with ether. The ether extract was dried with anhydrous sodium sulphate and the ether was evaporated. 20 ml. of acetic anhydride were added to the residue and the mixture was heated on a water-bath for 30 minutes. The acetic anhydride was then distilled off, the residue was dissolved in water and the solution was made alkaline with sodium hydroxide and then extracted with ether. After drying with sodium sulphate the hydrochloride of 2-(p-ethoxybenzoyl)-3-($\beta$-pyrrolidinoethoxy)-5-acetamidobenzofuran was precipitated by the addition of dry hydrogen chloride dissolved in ether. Recrystallisation from acetone gave 1.5 of the hydrochloride (M.P. 185–200° C., equivalent weight: calculated 473, found 475).

EXAMPLE XV 22.3 g. of 2-(p-ethoxybenzoyl)-3-hydroxy-6-(p-ethoxybenzoyloxy)-benzofuran were dissolved in 250 ml. of acetone and 20.7 g. of potassium carbonate were added. To the mixture were then added 9.0 g. of pyrrolidinoethylchloride-hydrochloride and the reaction mixture was heated with reflux during 24 hours. After cooling to room temperature the mixture was filtered and the precipitate washed with acetone. The combined acetone solutions were evaporated in vacuo. The solid residue was dissolved in acetone and the solution was acidified to pH 4–5 by the addition of a solution of dry hydrogen chloride in ether. Recrystallisation from isopropanol gave 10.9 g. of the hydrochloride of 2-(p-ethoxybenzoyl)-3-($\beta$ - pyrrolidinoethoxy)-6-(p-ethoxybenzoyloxy) - benzofuran was obtained (M.P. 160–166° C., equivalent weight: calculated 580, found 590).

The starting material was prepared in the following way: To a solution of 42.0 g. 2,4-dihydroxy-$\omega$-chloracetophenone in 1500 ml. of acetone were added 91.0 g. of p-ethoxybenzoylchloride and 250 g. of potassium carbonate and the mixture was boiled with reflux during 2.5 hours. After cooling to room temperature the precipitate was collected, washed with acetone, suspended in water and the suspension acidified with hydrochloric acid. After filtering and recrystallisation from methyl ethyl ketone 71.6 g. of 2-(p-ethoxybenzoyl)-3-hydroxy-6-p-ethoxybenzoyloxybenzofuran (M.P. 174° C.) were obtained.

EXAMPLE XVI 8.3 g. of the hydrochloride of 2-(p-ethoxybenzoyl)-3-($\beta$ - pyrrolidinoethoxy) - 6 - (p-ethoxybenzoyloxy)-benzofuran was dissolved in 50 ml. of 95% ethanol and a solution of 4.0 g. of potassium hydroxide in 30 ml. of 95% ethanol was added. The mixture was boiled under reflux for 1 hour and the ethanol was distilled off after dilution with water. The residue was acidified with hydrochloric acid and then made alkaline with sodium carbonate. The resulting crystals of 2-(p-ethoxybenzoyl) - 3 - ($\beta$-pyrrolidinoethoxy) - 6 - hydroxybenzofuran were collected. The base was converted into the hydrochloride (3.5 g. after recrystallisation from ethanol) having an M.P. of 200–214° C. and an equivalent weight: calculated 432, found 439.

EXAMPLE XVII 1.5 g. of 2-(p-ethoxybenzoyl)-3-($\beta$-pyrrolidinoethoxy)-6-hydroxybenzofuran-hydrochloride was dissolved in 25 ml. of water and the solution was made alkaline with sodium carbonate. The crystalline base thus obtained was collected and dissolved in 25 ml. of acetone. 0.28 g. of acetyl chloride in 10 ml. of acetone was added to the acetone solution and the mixture was boiled under reflux for 1 hour and then cooled. Recrystallisation of the resulting crystals from isopropanol gave 1.4 g. of the hydrochloride of 2-(p-ethoxybenzoyl)-3-($\beta$ - pyrrolidinoethoxy)-6-acetoxybenzofuran (M.P. 116–124° C., equivalent weight: calculated 474, found 480).

EXAMPLE XVIII 10.0 g. of 2-(p-ethoxybenzoyl)-3-($\beta$-$N^1$-benzylpiperazinoethoxy) - 5 - methylbenzofuran - hydrochloride were dissolved in 100 ml. 95% ethanol. The solution was hydrogenated with 420 ml. of hydrogen using 0.5 g. of palladized charcoal as catalyst. After filtration the ethanol was evaporated. Recrystallisation from ethanol gave 6.7 of the dihydrochloride of 2 - (p - ethoxybenzoyl) - 3-($\beta$ - piperanzinoethoxy) - 5 - methylbenzofuran (M.P. 160–170° C., equivalent weight: calculated 241, found 245).

The compounds specified in the following tables (in which A, R, $R^1$, $R^2$, $R^3$ and $R^4$ have the significance given above) were obtained in an analogous manner. Equivalent weights and melting points refer to the hydrochlorides.

| Example | A | R | $R_1$ | $R_2$ | $-N\begin{smallmatrix}R_3\\R_4\end{smallmatrix}$ | Equivalent weight Found | Equivalent weight Calculated | M.P., °C. |
|---|---|---|---|---|---|---|---|---|
| XIX | —$CH_2CH_2$— | phenyl | H | 5—$CH_3$ | —N($C_2H_5$)$_2$ | 389 | 388 | 174–76 |
| XX | —$CH_2CH_2$— | phenyl | H | 5—$CH_3$ | —N($C_2H_5$)($CH_2CH_2$—O—$CH_2CH_2$) | 412 | 402 | 187–90 |
| XXI | —$CH_2CH_2CH_2$— | p-$OCH_3$-phenyl | H | 5—$CH_3$ | —N($C_2H_5$)$_2$ | 406 | 402 | 156–58 |
| XXII | —$CH_2CH_2$— | p-$OCH_3$-phenyl | H | 5—$CH_3$ | —N($CH_2CH_2$—O—$CH_2CH_2$) | 445 | 432 | 147–51 |
| XXIII | —$CH_2CH_2$— | m-$OCH_3$-phenyl | H | 5—$CH_3$ | —N($CH_2CH_2$—O—$CH_2CH_2$) | 434 | 432 | 188–90 |
| XXIV | —$CH_2CH_2$— | phenyl | H | 5—$CH_3$ | —N($C_2H_5$)($CH_2CH_2$—O—$CH_2CH_2$) | 420 | 418 | 138–40 |
| XXV | —$CH_2CH_2$— | p-$OC_2H_5$-phenyl | H | 5—$CH_3$ | —N($C_2H_5$)($CH_2CH_2$—O—$CH_2CH_2$) | 447 | 446 | 183–88 |

| Example | A | R | $R_1$ | $R_2$ | $-N\overset{R_3}{\underset{R_4}{}}$ | Equivalent weight Found | Equivalent weight Calculated | M.P., °C. |
|---|---|---|---|---|---|---|---|---|
| XXXVI | —CH₂CH₂— | ⌬—C₂H₅ | H | 5-CH₃ | —N(CH₂CH₂)₂CH₂ (piperidine) | 444 | 444 | 187–90 |
| XXXVII | —CH₂CH₂— | ⌬—O—CH₂ (methylenedioxy) | H | 5-CH₃ | —N(CH₂CH₂)₂O (morpholine) | 446 | 446 | 167–70 |
| XXXVIII | —CH₂CH₂— | ⌬ | H | 5-OCH₃ | —N(CH₂CH)₂O (with CH₃) | 417 | 414 | 186–90 |
| XXXIX | —CH₂CH₂— | ⌬—OC₂H₅ | H | 5-CH₃ | —N(CH₂CH)₂(CH₃)₂ | 477 | 474 | 173–80 |
| XXX | —CH₂CH₂— | ⌬—OC₂H₅ | H | 5-CH₃ | —N(CH₂CH₂)₂O | 441 | 442 | 194–96 |
| XXXI | —CH₂CH₂— | ⌬—OCH₃ | H | 5-CH₃ | —N(CH₂CH)₂O | 429 | 428 | 182–86 |
| XXXII | —CH₂CH₂— | ⌬ | H | 6-OCH₃ | —N(CH₂CH₂)₂CH₂ | 417 | 414 | 90–110 |
| XXXIII | —CH₂CH₂— | ⌬ | H | 5-OCH₃ | —N(CH₂CH₂)₂CH₂ | 414 | 416 | 190–93 |
| XXXIV | —CH₂CH₂— | ⌬ | H | 6-OCH₃ | —N(CH₂CH₂)₂CH₂ | 419 | 146 | 161–64 |
| XXXV | —CH₂CH₂— | ⌬ | H | 5-OCH₃ | —N(CH₂CH₂)₂O | 417 | 418 | 196–200 |

| Example | A | R | R₁ | R₂ | $-N\begin{matrix}R_3\\R_4\end{matrix}$ | Equiv. wt. Found | Equiv. wt. Calculated | M.P., °C |
|---|---|---|---|---|---|---|---|---|
| XXXVI | —CH₂.CH₂— | —C₆H₄—OC₂H₅ | H | 7-CH₃ | —N(CH₂.CH₂)₂ | 433 | 430 | 190–197 |
| XXXVII | —CH₂.CH₂— | —C₆H₄—OC₂H₅ | H | 6-OCH₃ | —N(CH₂.CH₂)₂ | 444 | 446 | 112–14 |
| XXXVIII | —CH₂.CH₂— | —C₆H₄—OC₂H₅ | H | 5-OCH₃ | —N(CH₂.CH₂)₂ | 450 | 446 | 154–60 |
| XXXIX | —CH₂.CH₂.CH₂— | —C₆H₄—OC₂H₅ | H | 5-CH₃ | —N(CH₂.CH₂)₂ | 444 | 444 | 100–110 |
| XL | —CH(CH₃)—CH₂— | —C₆H₄—OC₂H₅ | 5-CH₃ | 5-CH₃ | —N(CH₂.CH₂)₂ | 440 | 444 | 166–68 |
| XLI | —CH₂.CH₂— | —C₆H₄—OC₂H₅ | H | 6-CH₃ | —N(CH₂.CH₂)₂ | 443 | 444 | 172–178 |
| XLII | —CH₂.CH₂— | —C₆H₄—O(CH₂)₂.CH₃ | H | 5-CH₃ | —N(CH₂.CH₂)₂ | 445 | 444 | 174–76 |
| XLIII | —CH₂.CH₂— | —C₆H₄—O(CH₂)₃.CH₃ | H | 5-CH₃ | —N(CH₂.CH₂)₂ | 457 | 458 | 176–77 |
| XLIV | —CH₂.CH₂— | —C₆H₄—OC₂H₅ | 4—CH₃, 5—Cl | 6—CH₃, 7—Cl₂ | —N(CH₂.CH₂)₂ | 540 | 513 | 204–208 |
| XLV | —CH(CH₃)—CH(CH₃)— | —C₆H₄—OC₂H₅ | H | 5—CH₃ | —N(CH₂.CH=CH—CH₂) | 460 | 470 | 115–20 |
| XLVI | —CH₂.CH₂— | —C₆H₄—C₂H₅ | H | H | —N(CH₂.CH=CH—CH₂) | 422 | 428 | 200–02 |

| Example | A | R | $R_1$ | $R_2$ | $-N\begin{smallmatrix}R_3\\R_4\end{smallmatrix}$ | Equivalent weight Found | Equivalent weight Calculated | M.P., °C. |
|---|---|---|---|---|---|---|---|---|
| XLVII | $-CH_2CH_2-$ | 4-CH$_3$-C$_6$H$_4$- | H | H | morpholino | 392 | 398 | 196-202 |
| XLVIII | $-CH_2CH_2-$ | 3-Cl-C$_6$H$_4$- | H | H | morpholino | 415 | 418 | 133-42 |
| XLIX | $-CH_2CH_2-$ | C$_6$H$_5$- | H | 5-Br | morpholino | 463 | 462 | 158-60 |
| L | $-CH_2CH_2-$ | C$_6$H$_5$- | H | H | morpholino | 363 | 371 | 152-54 |
| LI | $-CH_2CH_2-$ | C$_6$H$_5$- | H | 5-CH$_3$ | morpholino | 373 | 386 | 170-73 |
| LII | $-CH_2CH_2-$ | 3-OC$_2$H$_5$-C$_6$H$_4$- | H | H | morpholino | 416 | 416 | 202-04 |
| LIII | $-CH_2CH_2-$ | C$_6$H$_5$- | H | 5-Cl | morpholino | 411 | 418 | 176-79 |
| LIV | $-CH_2CH_2-$ | C$_6$H$_5$- | 5-CH$_3$ | 6-CH$_3$ | morpholino | 415 | 412 | 162-65 |
| LV | $-CH_2CH_2-$ | C$_6$H$_5$- | H | 6-CH$_3$ | morpholino | 396 | 398 | 167-68 |
| LVI | $-CH_2CH_2-$ | C$_6$H$_5$- | 5-CH$_3$ | 7-CH$_3$ | morpholino | 401 | 412 | 206-11 |
| LVII | $-CH_2CH_2-$ | C$_6$H$_5$- | 5-Cl | 6-CH$_3$ | morpholino | 429 | 433 | 186-88 |

| Example | A | R | R₁ | R₂ | -NR₃R₄ | Equivalent weight Found | Equivalent weight Calculated | M.P., °C |
|---|---|---|---|---|---|---|---|---|
| LVIII | —CH₂CH₂— | —C₂H₅ | H | 6-OCH₃ | piperidino | 372 | 368 | 159-63 |
| LIX | —CH₂CH₂— | —C₂H₅ | H | 6-OCH₃ | morpholino | 368 | 370 | 140-45 |
| LX | —CH₂CH₂— | —C₂H₅ | H | 6-OCH₃ | N(CH₃)₂ | 320 | 328 | 207-10 |
| LXI | —CH₂CH₂— | —CH₃ | H | 6-OCH₃ | N(CH₃)₂ | 311 | 314 | 197-98 |
| LXII | —CH₂CH₂— | —CH₃ | H | 6-OCH₃ | N(C₂H₅)₂ | 348 | 351 | 180-84 |
| LXIII | —CH₂CH₂CH₂— | —CH₃ | H | 6-OCH₃ | N(CH₃)₂ | 335 | 328 | 217— |
| LXIV | —CH₂CH₂— | —CH₃ | H | H | morpholino | 344 | 340 | 164-68 |
| LXV | —CH₂CH₂— | C₂H₅ | H | H | N(CH₃)₂ | 324 | 324 | 150-51 |
| LXVI | —CH₂CH₂— | —C₂H₅ | H | 5-OCH₃ | piperidino | 371 | 368 | 210-12 |
| LXVII | —CH₂CH₂— | —C₂H₅ | H | 5-CH₃ | morpholino | 356 | 354 | 190-93 |
| LXVIII | —CH₂CH₂— | —C₂H₅ | H | 5-CH₃ | piperidino | 353 | 352 | 188-90 |

| Example | A | R | $R_1$ | $R_2$ | $-N<\begin{smallmatrix}R_3\\R_4\end{smallmatrix}$ | Equivalent weight Found | Equivalent weight Calculated | M.P., °C. |
|---|---|---|---|---|---|---|---|---|
| LXIX | —CH₂CH₂— | —CH₃ | H | | —N(CH₂CH₂OCH₂CH₂) (morpholino) | 350 | 354 | 200–03 |
| LXX | —CH₂CH₂— | p-C₆H₄-OC₂H₅ | H | 5,6-benzo | —N(CH₂CH₂CH₂CH₂CH₂) (piperidino) | 469 | 466 | 184–188 |
| LXXI | —CH₂CH₂— | p-C₆H₄-OC₂H₅ | H | 4-CH₃ | —N(CH₂CH₂CH₂) (pyrrolidino) | 420 | 430 | 164–170 |
| LXXII | —CH₂CH₂— | p-C₆H₄-OC₂H₅ | H | 4-OCH₃ | —N(CH₂CH₂CH₂CH₂) | 445 | 446 | 178–182 |
| LXXIII | —CH₂CH₂— | p-C₆H₄-OC₂H₅ | H | 6,7-benzo | —N(CH₂CH₂CH₂CH₂) | 465 | 466 | 216–223 |
| LXXIV | —CH₂CH₂— | p-C₆H₄-OC₂H₅ | H | 5-CH₃ | —N(CH₂CH₂-C₆H₅)(CH₃) | 478 | 494 | 158–160 |
| LXXV | —CH₂CH₂— | p-C₆H₄-OC₂H₅ | H | 5-Cl | —N(CH₂CH₂)(CH₃) | 440 | 450 | 206–212 |
| LXXVI | —CH₂CH₂— | p-C₆H₄-OC₂H₅ | H | 5-CH₃ | —N(CH₃)(CH₃) | 416 | 404 | 168–172 |
| LXXVII | —CH₂CH₂— | p-C₆H₄-OC₂H₅ | H | 5-Br | —N(CH₂CH₂)(CH₃) | 495 | 495 | 194–200 |
| LXXVIII | —CH₂CH₂— | p-C₆H₄-OC₂H₅ | H | 6-Cl | —N(CH₂CH₂)(CH₂CH₂) | 461 | 451 | 168–170 |

| Example | A | R | $R_1$ | $R_2$ | $-N\begin{smallmatrix}R_3\\R_4\end{smallmatrix}$ | Equivalent weight Found | Equivalent weight Calculated | M.P., °C. |
|---|---|---|---|---|---|---|---|---|
| LXXIX | $-CH_2CH_2-$ | phenyl | H | 5-$NO_2$ | $-N(CH_2CH_2)_2$ | 461 | 461 | 200–210 |
| LXXX | $-CH_2CH_2-$ | methylenedioxyphenyl | H | 5-$CH_3$ | $-N(CH_2CH_2)_2$ | 435 | 430 | 170–172 |
| LXXXI | $-CH_2CH_2-$ | 4-Cl-phenyl | H | 5-$CH_3$ | $-N(CH_2CH_2)_2$ | 420 | 420 | 200–205 |
| LXXXII | $-CH_2CH_2-$ | 4-$OC_2H_5$-phenyl | 4,5-benzo | | $-N(CH_2CH_2)_2$ | 472 | 466 | 186–190 |
| LXXXIII | $-CH_2CH_2-$ | 4-$OC_2H_5$-phenyl | 5-$CH_3$ | 7-$CH_3$ | $-N(CH_2CH_2)_2$ | 456 | 444 | 184–186 |
| LXXXIV | $-CH_2CH_2-$ | 4-$OC_2H_5$-phenyl | H | 5-$OC_2H_5$ | $-N(CH_2CH_2)_2$ | 464 | 460 | 172–174 |
| LXXXV | $-CH_2CH_2-$ | 4-$OC_2H_5$-phenyl | H | 6-$CH_3$ | $-N(CH_2CH_2)_2$ | 430 | 430 | 188–192 |
| LXXXVI | $-CH_2CH_2-$ | 4-$OC_2H_5$-phenyl | H | 5-n-$C_3H_7$ | $-N(CH_2CH_2)_2$ | 458 | 458 | 152–154 |
| LXXXVII | $-CH_2CH_2-$ | 4-$OC_2H_5$-phenyl | 4-$CH_3$ | 5-Cl, 6-$CH_3$ | $-N(CH_2CH_2)_2$ | 478 | 478 | 190–192 |
| LXXXVIII | $-CH_2CH_2-$ | 4-$OC_2H_5$-phenyl | 5-$CH_3$ | 6,7-di-$CH_3$ | $-N(CH_2CH_2)_2$ | 458 | 458 | 170–173 |
| LXXXIX | $-CH_2CH_2-$ | 4-F-phenyl | H | 5-$CH_3$ | $-N(CH_2CH_2)_2$ | 414 | 404 | 188–190 |

| Example | A | R | R₁ | R₂ | R₃\N\R₄ | Equivalent weight Found | Equivalent weight Calculated | M.P., °C. |
|---|---|---|---|---|---|---|---|---|
| XC | —CH₂.CH₂— | —CH=CH—⌬—OC₂H₅ | H | 5-CH₃ | —N(CH₂CH₂)₂ | 460 | 456 | 196-200 |
| XCI | —CH₂.CH₂— | ⌬—½C₂H₅ | H | 5-OC₆H₅ | —N(CH₂CH₂)₂ | 523 | 520 | 191-193 |
| XCII | —CH₂.CH₂— | ⌬—OC₂H₅ | H | 5-F | —N(CH₂CH₂)₂ | 435 | 434 | 220-223 |
| XCIII | —CH₂.CH₂— | ⌬—OC₂H₅ | H | 5-C₂H₅ | —N(CH₂CH₂)₂ | 434 | 444 | 155-159 |
| XCIV | —CH₂.CH₂— | ⌬—CH₃ | H | 5-CH₃ | —N(CH₂CH₂)₂ | 402 | 400 | 188-19 |
| XCV | —CH₂.CH₂— | ⌬—OC₂H₅ | H | 5-CH₃ | —N(C₂H₅)₂ | 434 | 432 | 164-167 |
| XCVI | —CH₂.CH₂— | ⌬—CF₃ | H | 5-CH₃ | —N(CH₂CH₂)₂ | 455 | 454 | 136-144 |
| XCVII | —CH₂.CH₂— | ⌬—OC₂H₅ | H | 5-NH₂ | —N(CH₂CH₂)₂ | 435 | 431 | 165-185 |
| XCVIII | —CH₂.CH₂— | ⌬—OC₂H₅ | H | 5-CH₃CONH | —N(CH₂CH₂)₂ | 475 | 473 | 185-200 |
| XCIX | —CH₂.CH₂.CH₂— | ⌬—OC₂H₅ | H | 5-CH₃ | —N(CH₂CH₂)₂N—CH₃ | 249 | 254 | 195-204 |
| C | —CH₂.CH₂— | ⌬—OC₂H₅ | H | 6-O—C(=O)—⌬—OC₂H₅ | —N(CH₂CH₂)₂ | 590 | 580 | 160-166 |

| Example | A | R | $R_1$ | $R_2$ | $-N\genfrac{}{}{0pt}{}{R_3}{R_4}$ | Equiv. Wt. Found | Equiv. Wt. Calculated | M.P. °C |
|---|---|---|---|---|---|---|---|---|
| CI | $-CH_2CH_2-$ | $-C_6H_4-O-C_2H_5$ (p) | H | 5-$CH_3$ | $-N(CH_2CH_2)_2N-CH_2-C_6H_5$ | 285 | 286 | 218-225 |
| CII | $-CH_2CH_2-$ | $-C_6H_4-O-C_2H_5$ (p) | H | 6-OH | $-N(CH_2CH_2)_2$ | 439 | 432 | 200-214 |
| CIII | $-CH_2CH_2-$ | $-C_6H_4-O-C_2H_5$ (p) | H | 5-$CH_3$ | $-N(CH_2CH_2)_2NH$ | 245 | 241 | 160-170 |
| CIV | $-CH_2CH_2-$ | $-C_6H_4-O-C_2H_5$ (p) | H | 5-$CH_3$ | $-NHCH_3$ | 388 | 390 | 183-190 |
| CV | $-CH_2CH_2-$ | $-C_6H_4-O-C_2H_5$ (p) | H | 5-$CH_3$ | $-N(CH_2CH_2CH_2)_2$ | 454 | 458 | 180-190 |
| CVI | $-CH_2CH_2-$ | $-C_6H_4-O-C_2H_5$ (p) | H | 5-$CH_3$ | $-N(CH_3)(CH_2-C_6H_5)$ | 486 | 480 | 140-150 |
| CVII | $-CH_2CH_2-$ | $-C_6H_4-O-C_2H_5$ (p) | H | 6-$OCOCH_3$ | $-N(CH_2CH_2)_2$ | 480 | 474 | 116-124 |

The following examples illustrate the production of pharmaceutical preparations according to the invention.

EXAMPLE CVIII

An antitussive syrup containing 2% (weight per volume) of active substance was produced from the following ingredients:

2-(p-ethoxybenzoyl)-3-(β-pyrrolidinoethoxy)-5,6-dimethylbenzofuran _____ g__ 2.0
Saccharin _____ g__ 0.6
Sugar _____ g__ 3.0
Glycerin _____ g__ 5.0
Distilled water _____ g__ 10.0
Aroma _____ g__ 0.1
Ethanol 96% _____ ml__ 100.0

The sugar and saccharin were dissolved in hot water. On cooling, the solution was made up to weight with water and the glycerin was added. The aqueous solution was poured into a solution of active substance and aroma in about 65 ml. of ethanol and was then made up to 100 ml. with ethanol.

The active substance may be replaced by one of its pharmaceutically acceptable acid addition salts.

EXAMPLE CIX 250 g. of 2-(p-ethoxybenzoyl)-3-(β-pyrrolidinoethoxy)-5-methylbenzofuran were mixed with 175.80 g. of lactose and 169.70 g. of potato starch, the mixture was moistened with an alcoholic solution of 10 g. of stearic acid and granulated through a sieve. After drying, 160 g. of potato starch, 200 g. of talc, 2.50 g. of magnesium stearate and 32 g. of colloidal silica were mixed in and the mixture was pressed into tablets (10000) each weighing 100 mg. and containing 25 mg. of active substance which are suitable for use as analgesic tablets. The tablets were marked with break lines to enable a dose other than 25 mg. or multiples thereof to be administered.

Antitussive tablets may be prepared by replacing the above active substance by 2-(p-ethoxybenzoyl)-3-(β-pyrrolidinoethoxy)-5,6-dimethylbenzofuran.

EXAMPLE CX

A granulate was prepared from 250 g. of 2-(p-ethoxybenzoyl)-3-(β-morpholinoethoxy) - 5-methylbenzofuran, 175.90 g. of lactose and an alcoholic solution of 10 g. of stearic acid. After drying, the granulate was mixed with 56.60 g. of colloidal silica, 165 g. of talcum, 20 g. of potato starch and 2.50 g. of magnesium stearate and pressed into 10,000 dragee centres. These were first coated with 6 g. of shellac, then with a concentrated syrup containing 502.28 g. of crystallized saccharose, 10 g. of gum arabic, 0.22 g. of dyestuff and 1.5 g. of titanium dioxide, and dried. Analgesic dragees weighing 120 mg. and containing 25 mg. of active substance, were obtained.

When 2-(p-ethoxybenzoyl)-3-(β-pyrrolidinoethoxy)-5,6-dimethylbenzofuran was used as the active substance, antitussive dragees were obtained.

EXAMPLE CXI 1.0 g. of 2-(p-ethoxybenzoyl)-3-(β-pyrrolidinoethoxy)-5-methylbenzofuran and 0.10 g. of ascorbic acid, were dissolved in distilled water up to 100 ml. This solution, each ml. of which corresponds to a content of 10 mg. of active substance, was used to fill ampoules, which were sterilized by heating in the usual way.

The following compounds of formula I, wherein A, R, $R^1$, $R^2$ and $$-N\begin{matrix}R^3\\R^4\end{matrix}$$

have the specified significance have been tested:

TABLE I

| Code Number | A | R | $R^1$ | $R^2$ | $-N\begin{matrix}R^3\\R^4\end{matrix}$ |
|---|---|---|---|---|---|
| 11/32 | —$CH_2.CH_2$— | —C$_6$H$_5$ | H | 5-$CH_3$ | —N($C_2H_5$)$_2$ |
| 11/34 | —$CH_2.CH_2$— | —C$_6$H$_5$ | H | 5-$CH_3$ | morpholino |
| 11/39 | —$CH_2.CH_2.CH_2$— | —C$_6$H$_5$ | H | 5-$CH_3$ | —N($C_2H_5$)$_2$ |
| 11/46 | —$CH_2.CH_2$— | —C$_6$H$_4$-o-OCH$_3$ | H | 5-$CH_3$ | morpholino |
| 11/48 | —$CH_2.CH_2$— | —C$_6$H$_4$-p-OCH$_3$ | H | 5-$CH_3$ | morpholino |
| 11/81 | —$CH_2.CH_2$— | —$C_2H_5$ | H | 6-$OCH_3$ | piperidino |
| 11/93 | —$CH_2.CH_2$— | —C$_6$H$_4$-OC$_2$H$_5$ | H | 5-$CH_3$ | morpholino |
| 11/94 | —$CH_2.CH_2$— | —C$_6$H$_4$-OC$_2$H$_5$ | H | 5-$CH_3$ | piperidino |
| 20/16 | —$CH_2.CH_2$— | —$C_2H_5$ | H | 6-$OCH_3$ | morpholino |
| 20/17 | —$CH_2.CH_2$— | —$C_2H_5$ | H | 6-$OCH_3$ | —N($CH_3$)$_2$ |
| 20/19 | —$CH_2.CH_2$— | —$CH_3$ | H | 6-$OCH_3$ | —N($CH_3$)$_2$ |
| 20/23 | —$CH_2.CH_2$— | —$CH_3$ | H | 6-$OCH_3$ | —N($C_2H_5$)$_2$ |
| 20/39 | —$CH_2.CH_2$— | —$C_2H_5$ | H | H | morpholino |
| 20/41 | —$CH_2.CH_2$— | —$C_2H_5$ | H | H | pyrrolidino |
| 20/46 | —$CH_2.CH_2$— | —$C_2H_5$ | H | 5-$CH_3$ | morpholino |

TABLE I—Continued

| Code Number | A | R | R¹ | R² | −N(R³)(R⁴) |
|---|---|---|---|---|---|
| 20/47 | −CH₂.CH₂− | −C₂H₅ | H | 5-CH₃ | pyrrolidino (−N(CH₂CH₂)(CH₂CH₂)−) |
| 20/99 | −CH₂.CH₂− | −C₆H₅ | H | 5-OCH₃ | piperidino |
| 23/05 | −CH₂.CH₂− | −C₆H₄−OC₂H₅ (p) | H | 5-CH₃ | 2,6-dimethylmorpholino |
| 23/10 | −CH₂.CH₂− | −C₆H₄−OC₂H₅ (p) | H | 5-CH₃ | piperidino |
| 23/27 | −CH₂.CH₂− | −C₆H₄−OCH₃ (p) | H | 5-CH₃ | piperidino |
| 26/04 | −CH₂.CH₂− | −C₆H₅ | H | 6-OCH₃ | piperidino |
| 26/09 | −CH₂.CH₂− | −C₆H₅ | H | 5-OCH₃ | morpholino |
| 26/23 | −CH₂.CH₂− | −C₆H₄−OC₂H₅ (p) | H | H | piperidino |
| 26/35 | −CH₂.CH₂− | −C₆H₃(Cl)(CH₃) | H | H | piperidino |
| 26/38 | −CH₂.CH₂− | −C₆H₅ | H | H | piperidino |
| 26/41 | −CH₂.CH₂ | −C₆H₅ | H | 5-Br | piperidino |
| 26/43 | −CH₂.CH₂ | −C₆H₄−OC₂H₅ (p) | H | 5-CH₃ | −N(C₂H₅)₂ |
| 26/44 | −CH₂.CH₂− | −C₆H₄−OC₂H₅ (p) | H | 5-CH₃ | pyrrolidino |
| 26/56 | −CH₂.CH₂− | −C₆H₅ | H | H | pyrrolidino |
| 26/57 | −CH₂.CH₂− | −C₆H₅ | H | 5-CH₃ | pyrrolidino |
| 38/95 | −CH₂.CH₂− | −C₆H₄−Cl | H | 5-CH₃ | pyrrolidino |
| 39/60 | −CH₂.CH₂− | −C₆H₄−OC₂H₅ | 5-CH₃ | 6-CH₃ | pyrrolidino |

TABLE I—Continued

| Code Number | A | R | R¹ | R² | -N(R³)(R⁴) |
|---|---|---|---|---|---|
| 42/38 | —CH₂.CH₂— | —C₆H₄—F | H | 5-CH₃ | —N(CH₂CH₂)₂ |
| 50/19 | —CH₂.CH₂— | —C₆H₄—OC₂H₅ | H | 5-F | —N(CH₂CH₂)₂ |
| 50/23 | —CH₂.CH₂— | —C₆H₄—CH₃ | H | 5-CH₃ | —N(CH₂CH₂)₂ |
| 53/40 | —CH₂.CH₂.CH₂— | —C₆H₄—OC₂H₅ | H | 5-CH₃ | —N(CH₂CH₂)₂N—CH₃ |
| 53/56 | —CH₂.CH₂— | —C₆H₄—OC₂H₅ | H | 5-NH₂ | —N(CH₂CH₂)₂ |
| 53/66 | —CH₂.CH₂— | —C₆H₄—OC₂H₅ | H | 6-OH | —N(CH₂CH₂)₂ |
| 56/54 | —CH₂.CH₂— | —C₆H₄—CF₃ | H | 5-CH₃ | —N(CH₂CH₂)₂ |
| 56/68 | —CH₂.CH₂— | —C₆H₄—OC₂H₅ | H | 5-CH₃ | —N(CH₂CH₂CH₂)₂ |
| 26/72 | —CH₂.CH₂— | —C₆H₄—OC₂H₅ | H | H | —N(CH₂CH₂)₂ |
| 27/23 | —CH₂.CH₂— | —C₆H₅ | H | 5-Cl | —N(CH₂CH=CHCH₂) |
| 27/25 | —CH₂.CH₂— | —C₆H₅ | 5-CH₃ | 6-CH₃ | —N(CH₂CH=CHCH₂) |
| 27/29 | —CH₂.CH₂— | —C₆H₅ | H | 6-CH₃ | —N(CH₂CH=CHCH₂) |
| 27/49 | —CH₂.CH₂— | —C₆H₅ | 5-CH₃ | 7-CH₃ | —N(CH₂CH=CHCH₂) |
| 38/38 | —CH₂.CH₂— | —C₆H₄—OC₂H₅ | H | 5-OCH₃ | —N(CH₂CH₂)₂ |
| 38/42 | —CH₂.CH₂.CH₂— | —C₆H₄—OC₂H₅ | H | 5-CH₃ | —N(CH₂CH₂)₂ |
| 38/43 | —CH(CH₃).CH₂— | —C₆H₄—OC₂H₅ | H | 5-CH₃ | —N(CH₂CH₂)₂ |
| 38/83 | —CH₂.CH₂— | —C₆H₄—OC₂H₅ | H | 5-Cl | —N(CH₂CH₂)₂ |

TABLE I—Continued

| Code Number | A | R | R¹ | R² | $-N\begin{matrix}R^3\\R^4\end{matrix}$ |
|---|---|---|---|---|---|
| 38/84 | —CH₂.CH₂— | ⌬—OC₂H₅ | H | 5-CH₃ | —N(CH₃)₂ |
| 38/90 | —CH₂.CH₂— | ⌬—OC₂H₅ | H | 5-NO₂ | —N(CH₂.CH₂)₂ (pyrrolidinyl) |
| 43/47 | —CH₂.CH₂— | ⌬—OCH(CH₃)₂ | H | 5-CH₃ | —N(CH₂.CH₂)₂ (pyrrolidinyl) |

Compounds corresponding to Formula I, above, wherein substituents A, R, R¹, R², and $$N\begin{matrix}R^3\\R^4\end{matrix}$$

are variously selected as shown in Table I, below, were tested subjected to a series of statistically significant experiments in accordance with standard experimental procedures. These procedures are described below and the results are set forth in Table II, herein.

TABLE II

| Compound (code number) | LD₅₀, mg./kg. body-weight | Analgetic effect | Antitussive effects | Spasmolytic effect | Local anesthetic effect |
|---|---|---|---|---|---|
| Codeine | 150 | ++++ | | | |
| Pethidine | 100 | ++++ | | | |
| d-Propoxyphene-HCl | 100 | ++++ | | | |
| Phenacetin | 400 | (+)+ | | | |
| Amidopyrine | 300 | (+)+ | | | |
| Acetylsalicylic acid (sodium salt) | 600 | (+) | | | |
| Codeine phosphate | 140 | | +++ | | |
| Diphenhydramine | 80 | | | 1.0 | |
| Lidocaine | 140 | | | | 1.0 |
| Papaverine | ¹ 500 | | | 0.33 x diphenhydramine | |
| 11/32 | 100 | ++ | | | |
| 11/34 | >400 | ++ | | | |
| 11/39 | 100 | +++ | | | |
| 11/46 | 400 | + | | | |
| 11/48 | 400–800 | ++ | ++ | | 3.2 x lidocaine |
| 11/81 | 200 | +++ | | 0.35 x diphenhydramine | 2–4 x lidocaine |
| 11/93 | 400 | ++ | + | | |
| 11/94 | 100 | ++++ | ++ | 1.0 x diphenhydramine | |
| 20/16 | >400 | + | | | |
| 20/17 | 50–100 | +++ | | | |
| 20/19 | 50–100 | +++ | | | |
| 20/23 | 50–100 | +++ | | | |
| 20/39 | 200–400 | + | | | |
| 20/41 | 100 | ++ | | | |
| 20/46 | >800 | + | | | |
| 20/47 | 200–400 | ++ | | | |
| 20/99 | 150 | ++ | | | |
| 23/05 | >400 | (+)+ | | | |
| 23/10 | 250 | +++ | + | | |
| 23/27 | 200 | +++ | + | 1.1 x diphenhydramine | |
| 26/04 | 150 | + | | | |
| 26/09 | >800 | + | ++ | | ~10–15 x lidocaine |
| 26/23 | 300 | ++ | | | |
| 26/35 | 150 | ++ | + | | |
| 26/38 | 200 | ++ | | | |
| 26/41 | 300 | ++ | | | |
| 26/43 | ¹ 250 | | +++ | 1.0 x diphenhydramine | ~25 x lidocaine |
| 26/44 | 100 | ++++ | +++ | 0.7 x diphenhydramine | ~28 x lidocaine |
| 26/56 | 75 | ++++ | + | 0.5 x diphenhydramine | 8 x lidocaine |
| 26/57 | 100 | +++ | | | |
| 43/47 | ² 250 | ++++³ | +++ | 1.7 x papaverine | ~32–64 x lidocaine |
| 26/72 | 75 | ++++ | ++ | | |
| 27/23 | 300 | ++ | | | |
| 27/25 | 300 | (+)+ | | | |
| 27/29 | 200 | + | | | |
| 27/49 | 200 | + | | | |
| 38/38 | ¹ 70 | | ++ | | |
| 38/42 | ¹ 335 | | +++ | | |
| 38/43 | ¹ 360 | | ++ | 0.8 x diphenhydramine | ~20 x lidocaine |
| 38/83 | ¹ >200 | | +++ | | |
| 38/84 | ¹ 420 | | + | | |
| 38/90 | 50 | | +++ | 1.25 x diphenhydramine | |
| 38/95 | ¹ >400 | | + | 0.4 x diphenhydramine | ~16–32 x lidocaine |
| 39/60 | ¹ 600 | | ++ | 0.33 x diphenhydramine | ~10–20 x lidocaine |
| 42/38 | ¹ 420 | | + | | |
| 50/19 | ² 595 | | | 1.0 x diphenhydramine | |
| 50/23 | ¹ 650 | | ++ | 1.0 x diphenhydramine | |
| 53/40 | ¹ 470 | | | 0.6 x diphenhydramine | ~16–32 x lidocaine |
| 53/56 | ¹ 285 | | | 0.33 x diphenhydramine | |
| 53/66 | ¹ 800 | | | | ~8–16 x lidocaine |
| 56/54 | ¹ >1,600 | | | 0.33 x diphenhydramine | |
| 56/68 | ¹ 630 | | ++ | 0.33 x diphenhydramine | ~16–32 x lidocaine |

¹ Subcutaneous administration.
² Peroral administration.
³ According to Friebel (cf. note in col. 39).

The tests were performed as follows:

*Toxicity.*—The compound to be tested was administered to groups of 10 albino mice. The animals were observed for 24 hours. The number of mice which were killed by the compound at each dose was recorded and expressed as the percentage of the number of animals injected at this dose. The dose which killed 50% of the animals ($LD_{50}$) was estimated from a logarithmic dose response curve based on 3 to 4 doses. The results are given in Table II. Generally the toxicity upon intraperitoneal administration but in some cases the subcutaneous or peroral toxicity was estimated, which has been indicated in the table.

*Analgetic effect.*—The analgetic effect was estimated according to a method that consists in electric stimulation of the tail in mice [Eder et al. Arzneimittelforschung 11 (1961), 1043].[1] The analgetic effect is reported in the following way:

| $ED_{50}$, mg./kg. bodyweight: | Analgetic effect |
|---|---|
| <25 | + + + + |
| 25–50 | + + + |
| 50–100 | + + |
| 100–200 | + |

As a comparison the analgetic effect of codeine, pethidine, propoxyphene hydrochloride, phenacetin amidopyrine and acetylsalicylic acid, (sodium salt) was estimated using the same method.

*Antitussive effect.*—The antitussive effect was investigated by estimating the dose of the test compound which upon intravenous injection revoked electrically induced attacks of coughing in narcotized cat (Domenjoz Arch. für exper. Pathologie u. Pharmakologie 215 19–24 (1952)). The effect is reported in the following way:

| $Ed_{50}$, mg./kg. bodyweight | Antitussive effect |
|---|---|
| 2 | +++ |
| 2–3 | ++ |
| 3–5 | + |

As a comparison the antitussive effect of codeine phosphate was estimated by the same method.

$ED_{50}$ for the antitussive effect of the compound H 43/47 was found to be 0.1–0.25 mg./kg. bodyweight.

*Spasmolytic effect.*—The spasmolytic effect was estimated in classical way by measuring the reversion of $BaCl_2$—induced spasm in isolated small intestine of guinea pig. A comparison with the spasmolytic effect of diphenhydramine was carried out and the effect of the test compounds is recorded in parts of the effect of diphenhydramine. Also as a comparison the effect of papaverine is reported.

*Local anesthetic effect.*—The local anesthetic effect was estimated on rabbit cornea according to the method described in Wiedling, Acta Pharmacol, et toxicol. 8 (1952), 117. As a comparison the effect of lidocaine was estimated by using the same method. The effect of the compounds of the invention is recorded in parts of the effect of lidocaine.

These data show that the compounds set forth in Table I, above, possess therapeutic properties, as shown in significant degree. Moreover, all of the compounds of this invention particularly those shown in Table I possess each of the specific properties mentioned in Table II though in varying degrees.

We claim:

1. A compound selected from the class consisting of the benzofuran derivatives represented by the formula:

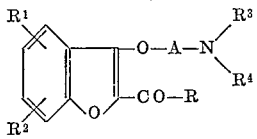

[1] Another method to estimate the analgetic effect is by stimulation of the tail in mice by light and heat [Friebel, H., and Reichle, C. Arch. exp. Path. Pharmak. 226 551 (1955)].

wherein R is a radical selected from the class consisting of phenyl, phenyl substituted by alkyl having from one to two carbon atoms, phenyl substituted by alkoxy having from one to four carbon atoms, dioxy methylene substituted phenyl, fluorine substituted phenyl, chlorine substituted phenyl, bromine substituted phenyl, and trifluoromethyl substituted phenyl; $R^1$ is a radical selected from the class consisting of hydrogen, fluorine, chlorine, bromine, alkyl having from one to five carbon atoms, and alkoxy having from one to four carbon atoms; $R^2$ is a radical selected from the class consisting of hydrogen, fluorine, chlorine, bromine, alkyl having from one to five carbon atoms, alkoxy with one to four carbon atoms, nitro, amino, hydroxy, provided that $R^1$ is hydrogen when $R^2$ is selected from the group consisting of nitro, amino, hydroxy; A is alkylene having from two to four carbon atoms; and —$NR^3R^4$ is a group selected from the class consisting of alkylamino of from one to five carbon atoms, dialkylamino of from one to five alkyl carbon atoms in each alkyl group, pyrrolidino, piperidino, hexamethyleneimino, morpholino, dimethylmorpholino, piperazino, N-methylpiperazino and tetrahydropyridino; and pharmaceutically acceptable salts thereof.

2. A compound according to claim 1 selected from the class consisting of the benzofuran derivatives represented by the formula

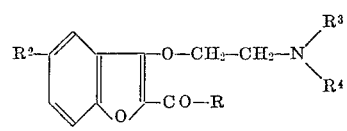

wherein R is a radical selected from the class consisting of phenyl and p-alkoxy phenyl having from one to four carbon atoms in the alkoxy group; $R^2$ is a radical selected from the class consisting of nitro, alkyl having from one to five carbon atoms, alkoxy with from one to four carbon atoms, hydrogen, fluorine, chlorine and bromine, and —$NR^3R^4$ is a group selected from the class consisting of dialkylamino of from one to five carbon atoms in each alkyl group, pyrrolidino, piperidino, morpholino, 2,6-dimethylmorpholino and tetrahydropyridino, and pharmaceutically acceptable salts thereof.

3. A compound according to claim 2 selected from the class consisting of the benzofuran derivatives represented by the formula

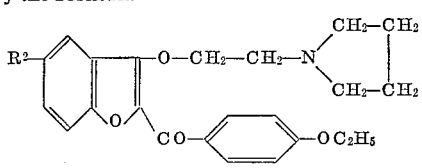

wherein $R^2$ is selected from the class consisting of hydrogen, methoxy, ethoxy, chlorine, bromine, fluorine and nitro.

4. A compound according to claim 2 selected from the class consisting of the benzofuran derivatives represented by the formula

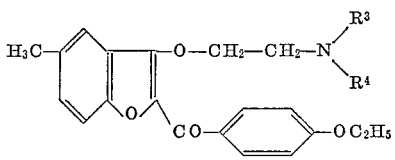

wherein —$NR^3R^4$ is a group selected from the class consisting of morpholino, tetrahydropyridino and piperidino.

5. A compound according to claim 2 of the formula

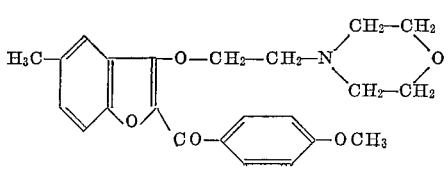

6. A compound according to claim 2, of the formula

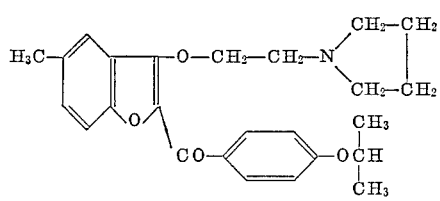

7. A compound according to claim 1 selected from the class consisting of the benzofuran derivatives represented by the formula

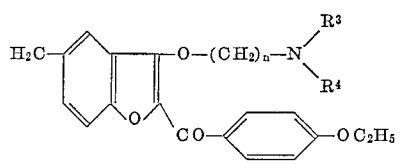

wherein $n$ is an integer from two to three inclusive, and $-NR^3R^4$ is a group selected from the class consisting of dimethylamino, diethylamino and pyrrolidino.

8. A compound according to claim 1 selected from the class consisting of the benzofuran derivatives represented by the formula

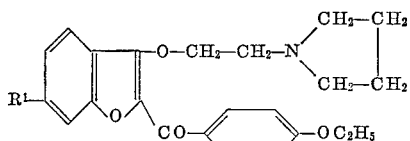

wherein $R^1$ is selected from the class consisting of methyl and methoxy.

9. A compound according to claim 1 of the formula

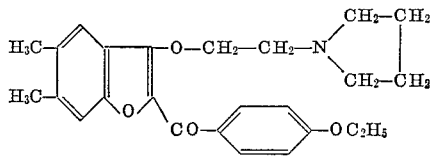

References Cited

UNITED STATES PATENTS 3,248,401  7/1966  Tondeur et al. _____ 260—346.2

ALEX MAZEL, Primary Examiner

J. TOVAR, Assistant Examiner

U.S. Cl. X.R.

260—268, 294.7, 297, 326.5, 340.5, 346.2; 424—248, 263, 267, 274, 282, 285

UNITED STATES PATENT OFFICE
CERTIFICATE OF CORRECTION

Patent No. 3,485,835            December 23, 1969

Arne Elof Brandstrom et al.

It is certified that error appears in the above identified patent and that said Letters Patent are hereby corrected as shown below:

Column 1, line 18, insert the number -- 4 -- to designate the position 4 in the benzene ring. Column 4, line 21, "thereby" should read -- there --. Column 7, line 19, "4'-$CC_2H_5$" should read -- 4'-$OC_2H_5$ --. Column 10, line 30, after "8.5 g." insert -- of 2-(p-ethoxybenzoyl)-3-hydroxy-5-methylbenzofuran, --. Column 14, Example XXIII, cancel "0" above the benzene ring under column "R". Columns 15 and 16, Example XXX, in the heterocyclic ring

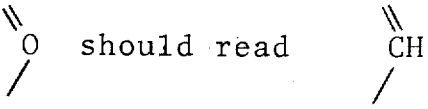

same column 16, Example XXXIII, ".CH " should read -- .$CH_2$ --; same column 16, Example XXXIV, under the heading "Calculated" "146" should read -- 416 --. Columns 17 and 18, Example XLIV, under the heading "$R_2$", "7-$Cl_3$" should read -- 7-Cl --. Columns 19 and 20, Example XLVIII, "133-42" should read -- 139-42 --; same columns 19 and 20, Example XLIX, in the heterocyclic ring

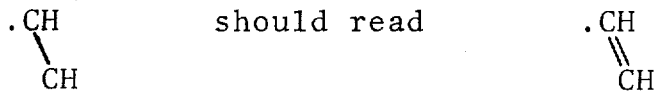

same columns 19 and 20,

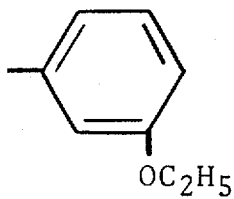     should read     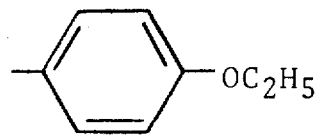

same columns 19 and 20, Example LV, "167-68" should read -- 165-68 --. Columns 21 and 22, Example LXIII, "217-" should read -- 217-20 --; same columns 21 and 22, Example LXV, "$C_2H_5$" should read -- -$C_2H_5$ --. Columns 25 and 26, Example LXXIX, under the heading "R"

3,485,835

(2)

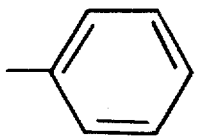  should read  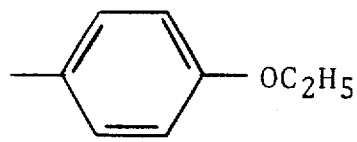

same columns 25 and 26, Example LXXX, under the heading "R" "CH₃" should read -- CH₂ --; same columns 25 and 26, Example LXXXV under column

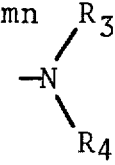  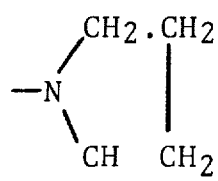  should read  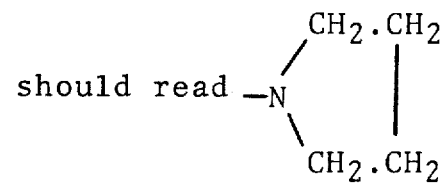

Columns 27 and 28

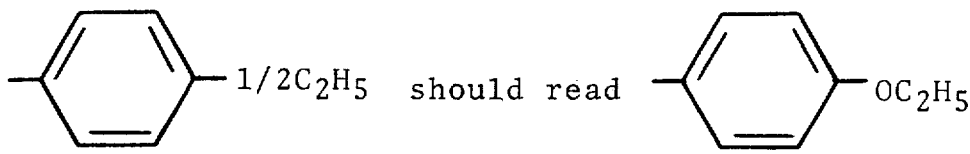

same columns 27 and 28, Example XCI, under the heading

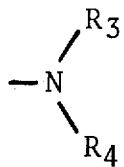  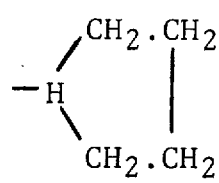  should read  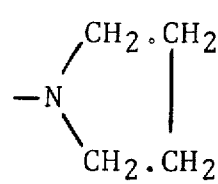

same columns 27 and 28, Example XCIII, under the heading

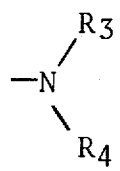  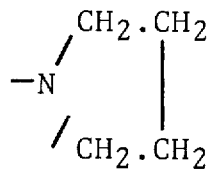  should read  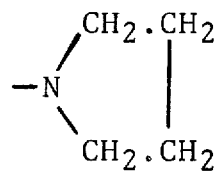

Columns 37 and 38, Table II, under the heading "Spasmolytic effect" "1.25 x diphenydramine" should read -- 1.25 x diphenhydramine --.

Signed and sealed this 15th day of December 1970.
(SEAL)
Attest:

EDWARD M. FLETCHER, JR.
Attesting Officer

WILLIAM E. SCHUYLER, JR.
Commissioner of Patents